United States Patent
Nago

(10) Patent No.: US 8,651,243 B2
(45) Date of Patent: Feb. 18, 2014

(54) HYDRAULIC RIM BRAKE FOR A BICYCLE

(75) Inventor: Daisuke Nago, Sakai (JP)

(73) Assignee: Shimano, Inc., Sakai (JP)

( * ) Notice: Subject to any disclaimer, the term of this patent is extended or adjusted under 35 U.S.C. 154(b) by 258 days.

(21) Appl. No.: 13/175,687

(22) Filed: Jul. 1, 2011

(65) Prior Publication Data

US 2012/0222922 A1    Sep. 6, 2012

Related U.S. Application Data

(63) Continuation-in-part of application No. 13/040,930, filed on Mar. 4, 2011, now Pat. No. 8,336,680.

(51) Int. Cl.
*B62L 1/06* (2006.01)

(52) U.S. Cl.
USPC ..................................... 188/24.12

(58) Field of Classification Search
USPC .............. 188/284, 287–289, 24.11–24.22
See application file for complete search history.

(56) References Cited

U.S. PATENT DOCUMENTS

| | | | |
|---|---|---|---|
| 3,338,337 A | 8/1967 | Freeland et al. | |
| 3,899,057 A | 8/1975 | Carre | |
| 4,230,309 A * | 10/1980 | Schnitzius | 267/120 |
| 4,819,770 A * | 4/1989 | Hahn | 188/284 |
| 4,877,226 A * | 10/1989 | Taylor | 267/196 |
| 5,495,923 A * | 3/1996 | Bruski et al. | 188/268 |
| 5,884,734 A * | 3/1999 | Hiramoto et al. | 188/322.18 |
| 7,389,642 B2 * | 6/2008 | Takizawa et al. | 60/547.1 |
| 8,336,680 B2 * | 12/2012 | Nago | 188/24.12 |
| 2006/0163016 A1 * | 7/2006 | Ferkany | 188/288 |

OTHER PUBLICATIONS

U.S. Appl. No. 13/040,930 "Center-Pull Bicycle Brake With Synchronized Brake Arms" (Daisuke Nago), filed Mar. 4, 2011.

* cited by examiner

*Primary Examiner* — Christopher Schwartz
(74) *Attorney, Agent, or Firm* — James A. Deland

(57) ABSTRACT

A bicycle brake apparatus comprises a first brake arm, a second brake arm and a piston assembly. A first control interface portion of the first brake arm is coupled to an output shaft of a piston, and a second control interface portion of the second brake arm is coupled to a housing of the piston assembly between first and second axial ends of the housing. An adjusting member may be disposed at the output shaft for adjusting a position of the output shaft relative to at least one of the housing or the first control interface portion of the first brake arm. The housing includes a first wall defining a piston chamber and a second wall defining an accumulator chamber. A radial distance from a movement axis to the second wall is greater than a radial distance from the movement axis to the first wall.

35 Claims, 15 Drawing Sheets

HYDRAULIC RIM BRAKE FOR A BICYCLE

CROSS REFERENCE TO RELATED APPLICATIONS

This application is a continuation-in-part of U.S. patent application Ser. No. 13/040,930 filed Mar. 4, 2011 and titled "Center-Pull Bicycle Brake With Synchronized Brake Arms."

BACKGROUND OF THE INVENTION

The present invention is directed to bicycle brakes and, more particularly, to a hydraulic rim brake for a bicycle.

Some bicycle brakes comprise first and second brake arms pivotably mounted to a bicycle frame member such as front fork or rear seat stay of the bicycle frame. Each brake arm includes a brake arm mounting portion for mounting the brake arm to the bicycle frame member, a brake pad mounting portion, and a control interface portion. The brake arm mounting portion is disposed between the brake pad mounting portion and the control interface portion such that the brake pad mounting portion is disposed below the brake arm mounting portion when the brake arm is mounted to the bicycle frame member. Such brakes may be cable operated or hydraulically operated.

U.S. Pat. Nos. 3,338,337 and 3,899,057 disclose examples of hydraulically operated brakes. As shown in those patents, a piston assembly is coupled to the control interface portions of the first and second brake arms. The piston assembly comprises a piston disposed within a hydraulic chamber formed in a housing, wherein the housing includes first and second axial ends. The piston includes an output shaft that extends from the first axial end of the housing. The output shaft is connected to the control portion of the first brake arm, and the second axial end of the housing is connected to the control portion of the second brake arm. During operation, hydraulic fluid is introduced into the hydraulic chamber to cause the piston to move axially towards the first axial end of the housing, thereby causing the output shaft to extend further from the first axial end of the housing. As a result, the control portion of the first brake arm moves away from the control portion of the second brake arm, thereby causing the brake pad mounting portions of the first and second brake arms to move towards the wheel rim so that brake pads mounted to the first and second brake arms contact the wheel rim.

SUMMARY OF THE INVENTION

The present invention is directed to various features of a bicycle brake device. In one embodiment, a bicycle brake apparatus comprises a first brake arm, a second brake arm and a piston assembly. The first brake arm includes a first brake arm mounting portion and a first control interface portion. Similarly, the second brake arm includes a second brake arm mounting portion and a second control interface portion. The piston assembly includes a housing with a fluid chamber, wherein the housing has a first axial end and a second axial end. A piston is movably disposed within the chamber, and an output shaft is coupled to the piston and extends from the first axial end of the housing. The first control interface portion of the first brake arm is coupled to the output shaft, and the second control interface portion of the second brake arm is coupled to the housing between the first axial end of the housing and the second axial end of the housing.

In another embodiment, a bicycle brake apparatus again comprises a first brake arm, a second brake arm and a piston assembly. The first brake arm includes a first brake arm mounting portion for mounting the first brake arm to a bicycle frame member, a first brake pad mounting portion, and a first control interface portion. Similarly, the second brake arm includes a second brake arm mounting portion for mounting the second brake arm to the bicycle frame member, a second brake pad mounting portion, and a second control interface portion. The piston assembly includes a housing with a fluid chamber, wherein the housing has a first axial end and a second axial end. A piston is movably disposed within the chamber, and an output shaft is coupled to the piston and extends from the first axial end of the housing. The first control interface portion of the first brake arm is coupled to the output shaft, and the second control interface portion of the second brake arm is coupled to the housing. An adjusting member is disposed at the output shaft outside of the chamber, wherein the adjusting member adjusts a position of the output shaft relative to at least one of the housing or the first control interface portion of the first brake arm.

In another embodiment, a cylinder apparatus comprises an inner cylindrical wall having a first wall and a second wall. The first wall defines a piston chamber, and the second wall defines an accumulator chamber. A piston is disposed within the piston chamber for movement along a movement axis. A radial distance from the movement axis to the second wall is greater than a radial distance from the movement axis to the first wall.

Additional inventive features will become apparent from the description below, and such features alone or in combination with the above features and their equivalents may form the basis of further inventions as recited in the claims.

DETAILED DESCRIPTION OF THE EMBODIMENTS

Figure 1:
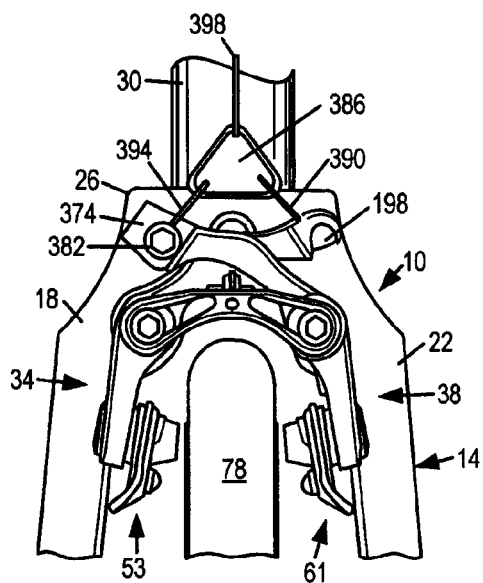
FIG. 1 is a front view of an embodiment of a bicycle brake device attached to a front fork of a bicycle.
Figure 2:
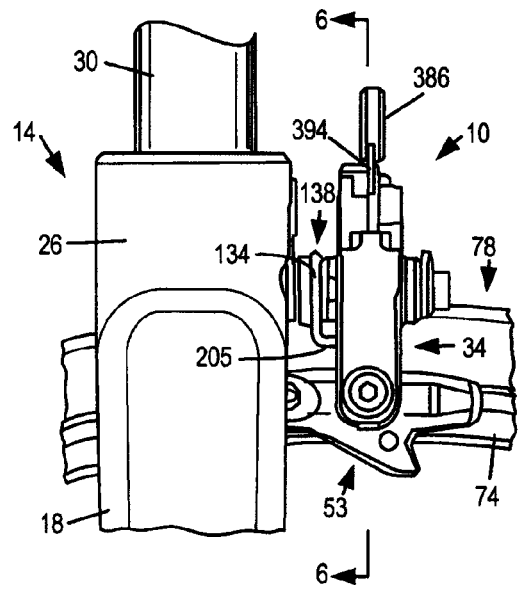
FIG. 2 is a right side view of the bicycle brake device.
Figure 3:
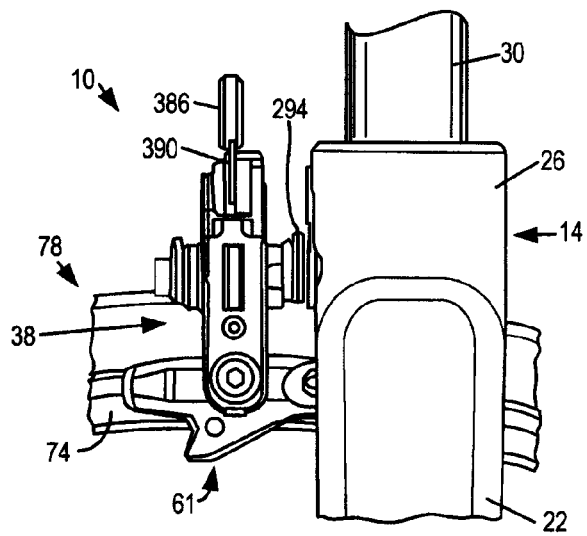
FIG. 3 is a left side view of the bicycle brake device.

FIG. 1 is a front view of an embodiment of a bicycle brake device 10 attached to a front fork 14 of a bicycle, FIG. 2 is a right side view of bicycle brake device 10, and FIG. 3 is a left side view of bicycle brake device 10. Front fork 14 has a typical structure wherein a first fork leg 18 and a second fork leg 22 extend downwardly from a bridging member 26 that is attached to a steering tube 30. Brake device 10 includes a first brake arm 34 and a second brake arm 38, wherein first brake arm 34 is rotatably mounted to first fork leg 18 and second brake arm 38 is rotatably mounted to second fork leg 22. As shown more clearly in FIG. 4, first brake arm 34 includes a first brake arm mounting portion 42 for mounting first brake arm 34 to first fork leg 18, a first brake pad mounting portion 46 and a first control interface portion such as a first control element attachment location such as a first cable mounting portion 50. First brake pad mounting portion 46 has a first brake pad mounting opening 52 for mounting a first brake pad 53 (FIG. 1) in a well-known manner. Similarly, second brake arm 38 includes a second brake arm mounting portion 54 for mounting second brake arm 38 to second fork leg 22, a second brake pad mounting portion 58 and a control interface portion such as a second control element attachment location such as a second cable mounting portion 62. Second brake pad mounting portion 58 has a second brake pad mounting opening 60 for mounting a second brake pad 61 in a well-known manner. As shown in FIGS. 1-3, first brake pad 53 and second brake pad 61 are adapted to frictionally contact a rim portion 74 of a wheel 78.

First brake arm mounting portion 42 includes a first mounting opening 66 for receiving a first mounting assembly 70 therethrough. First mounting assembly 70 includes a tubular first mounting base 82, nuts 86, 90, a tubular first bushing 94, a washer 98, a spacer 102, a washer 106, a tubular first pivot axle 110, and a first mounting bolt 114. First mounting base 82 includes a first mounting flange 118, a first spring mounting portion 122, a first bushing mounting portion 126 and a first threaded opening 130. First mounting flange 118 is structured to be welded or otherwise attached to first fork leg 18. First spring mounting portion 122 is structured to extend through a coil 134 of a return spring 138, and first bushing mounting portion 126 is structured to be inserted into an opening 142 in first bushing 94. First bushing 94 includes a first flange 146 and a first arm mounting portion 150, wherein first flange 146 abuts against nut 90, and first arm mounting portion 150 extends through first mounting opening 66 in first brake arm mounting portion 42.

First pivot axle 110 includes a first tubular portion 154, a first flange 158, and a first gate bridge supporting portion 162.

First tubular portion 154 extends through washer 106, spacer 102, washer 98, first arm mounting portion 150 of first bushing 94, and nuts 86 and 90 until first flange 158 abuts against washer 106. A gate bridge 166 includes a first gate bridge loop 170 and a second gate bridge loop 174, wherein first gate bridge loop 170 is structured to receive first gate bridge supporting portion 162 of first pivot axle 110 therein so that first gate bridge loop 170 abuts against first flange 158 of first pivot axle 110. First mounting bolt 114 extends through first pivot axle 110 and screws into first threaded opening 130 in first mounting base 82 to axially fix first brake arm 34 to first fork leg 18 so that first brake arm 34 is supported by first bushing 94 for rotation around a first pivot axis X1.

The upper portion of first brake arm 34 bends laterally inwardly from first brake arm mounting portion 42 and forms first cable mounting portion 50 at a distal end thereof. First cable mounting portion 50 includes plate-shaped, parallel and arcuate first and second end bead mounting claws 182 and 186 that form a substantially vertically-oriented cable receiving slot 190 therebetween. First end bead mounting claw 182 forms a first cable end bead receiving opening 194 for receiving a cable end bead 198 (FIG. 1) therein, and second end bead mounting claw 186 forms a second cable end bead receiving opening 202 for receiving cable end bead 198 therein.

A spring contacting surface 204 is formed on the laterally inner side surface of first brake arm 34 between first brake arm mounting portion 42 and first brake pad mounting portion 46 for contacting a first portion or spring end 205 of return spring 138. A pair of parallel, spaced-apart roller mounting ears 206 and 210 with corresponding mounting openings 214 and 218 are disposed on first brake arm 34 between first brake arm mounting portion 42 and first cable mounting portion 50. Mounting opening 214 is unthreaded, whereas mounting opening 218 is threaded. Mounting ears 206 and 210 are spaced apart for receiving a tubular spacer 222 and a tubular roller 226 therebetween. Spacer 222 and roller 226 are rotatably mounted between roller mounting ears 206 and 210 by a screw 230 that extends through mounting ear 206 and spacer 222 and screws into threaded opening 218. Roller 226 functions as a movement interface member in a manner discussed below.

Second brake arm mounting portion 54 includes a second mounting opening 234 for receiving a second mounting assembly 238 therethrough. Second mounting assembly 238 is substantially the same as first mounting assembly 70. Second mounting assembly 238 includes a tubular second mounting base 242, nuts 246, 250, a tubular second bushing 254, a washer 258, a spacer 262, a washer 266, a tubular second pivot axle 270, and a second mounting bolt 274. Second mounting base 242 includes a second mounting flange 278, a second spring mounting portion 282, a second bushing mounting portion 286 and a second threaded opening 290. Second mounting flange 278 is structured to be welded or otherwise attached to second fork leg 22. Second spring mounting portion 282 is structured to engage a second portion or spring end 294 of return spring 138, and second bushing mounting portion 286 is structured to be inserted into an opening 298 in second bushing 254. Second bushing 254 includes a second flange 302 and a second arm mounting portion 306, wherein second flange 302 abuts against nut 250, and second arm mounting portion 306 extends through second mounting opening 234 in second brake arm mounting portion 54.

Second pivot axle 270 includes a second tubular portion 310, a second flange 314, and a second gate bridge supporting portion 318. Second tubular portion 310 extends through washer 266, spacer 262, washer 258, second arm mounting portion 306 of second bushing 254, and nuts 246 and 250 until second flange 314 abuts against washer 266. Second gate bridge loop 174 of gate bridge 166 is structured to receive second gate bridge supporting portion 318 of second pivot axle 270 therein so that second gate bridge loop 174 abuts against second flange 314. Second mounting bolt 274 extends through second pivot axle 270 and screws into second threaded opening 290 in second mounting base 242 to axially fix second brake arm 38 to second fork leg 22 so that second brake arm 38 is supported by second bushing 254 for rotation around a second pivot axis X2.

Figure 4:
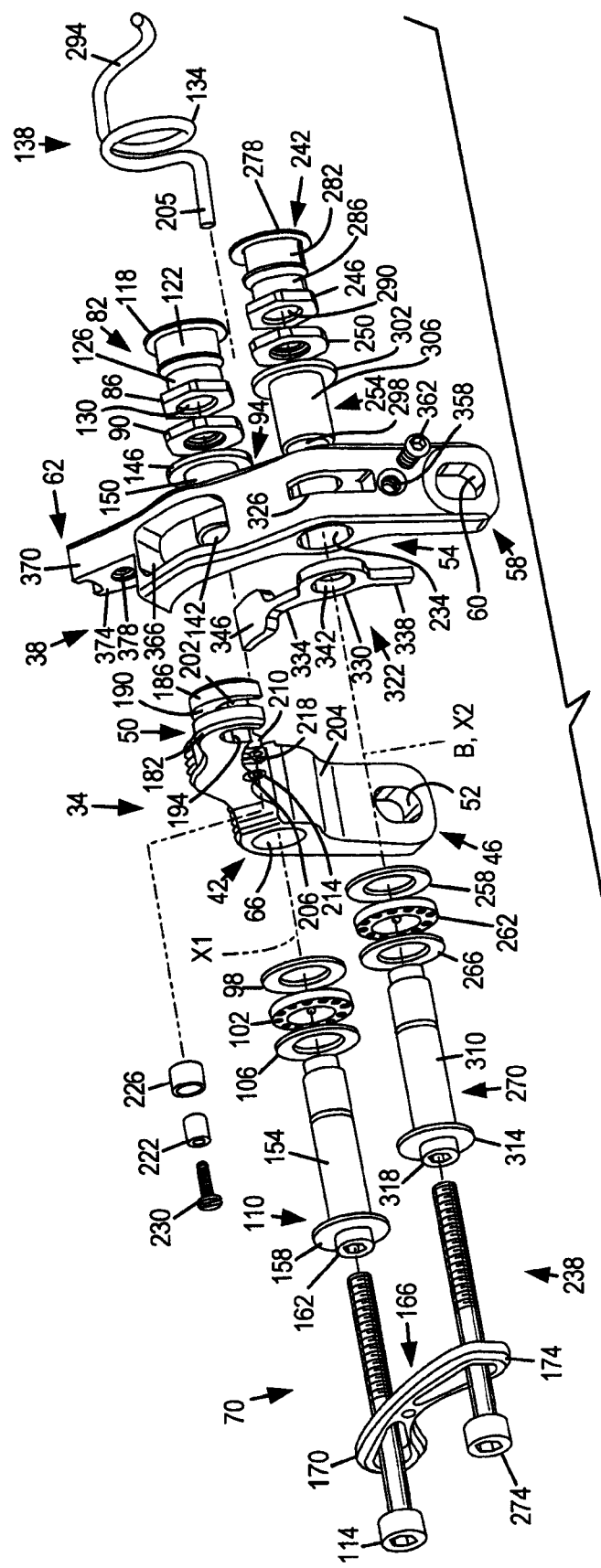
FIG. 4 is an exploded perspective view of the bicycle brake device.
Figure 5:
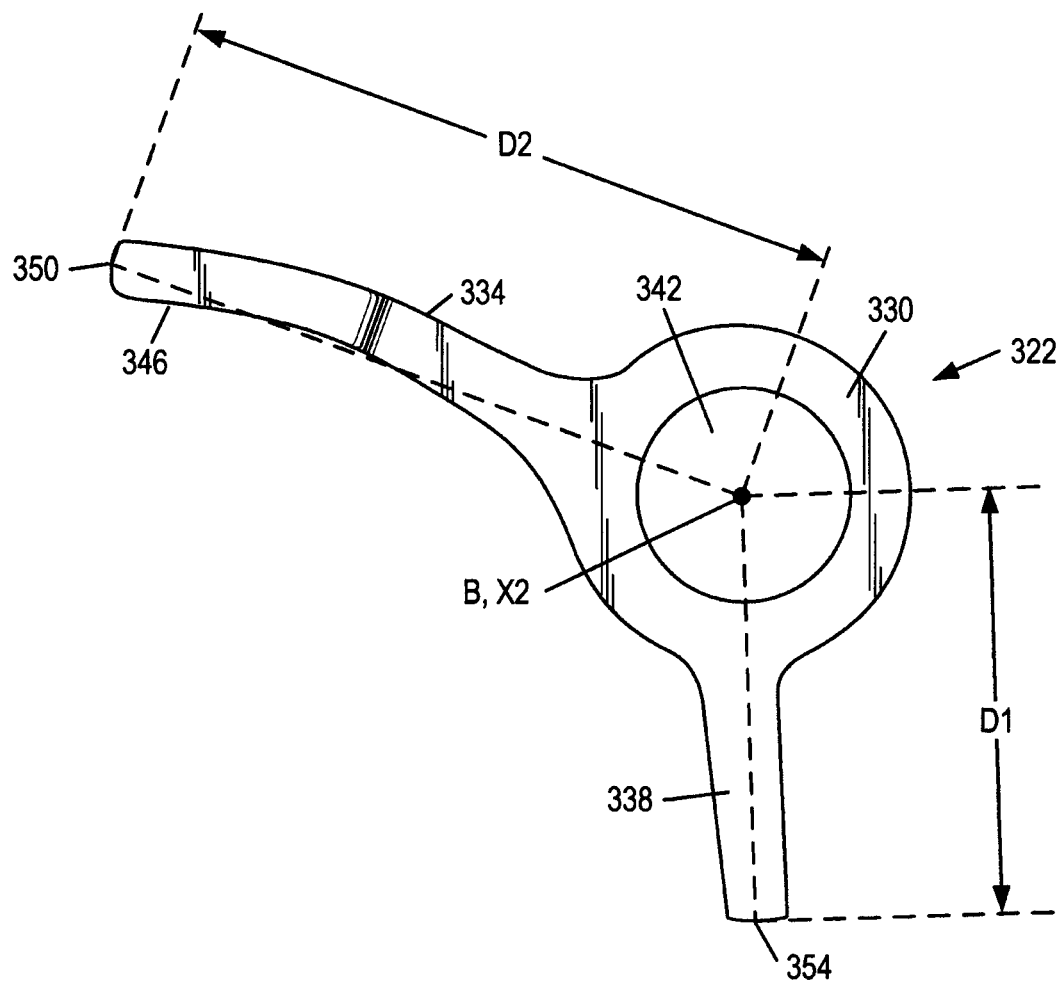
FIG. 5 is a front view of a bias communicating member.

An interface member in the form of a bias communicating member 322 is structured and dimensioned to be mounted within a vertical mounting groove 326 formed in second brake arm mounting portion 54 of second brake arm 38. In this embodiment, second pivot axis X2 intersects mounting groove 326 so that bias communicating member 322 pivots around a bias communicating member pivot axis B that is coaxial with second pivot axis X2. As shown in FIGS. 4 and 5, bias communicating member 322 is a continuous one-piece member that comprises a bias communicating member mounting portion 330, an axially-thin, rod-shaped first operating portion 338, and an axially-thick second operating portion 334, wherein bias communicating member mounting portion 330 is disposed between first operating portion 338 and second operating portion 334. As a result, first operating portion 338 is disposed between second brake arm mounting portion 54 and second brake pad mounting portion 58 of second brake arm 38 when bias communicating member 322 is mounted in mounting groove 326.

Bias communicating member mounting portion 330 is formed as an axially-thin, generally annular member having an opening 342 dimensioned to receive second arm mounting portion 306 of second bushing 254 therethrough. The end portion of second operating portion 334 is formed as an axially-thick, substantially square paddle 346 for engaging roller 226 mounted to first brake arm 34. The axially-thick, paddle-shaped second operating portion 334 helps to prevent mud and other foreign matter propelled upwardly from wheel 78 from impinging upon the control structures located above second control interface portion 334. Second operating portion 334, and particularly paddle 346, is dimensioned to extend substantially the entire distance from second brake arm 38 to first brake arm 34 when first brake arm 34 and second brake arm 38 are mounted to first and second fork legs 18 and 22, respectively. As shown in FIG. 5, first operating portion 338 has a first interface end 354, and second operating portion has 334 a second interface end 350. A distance D2 from bias communicating member pivot axis B to second interface end 350 is greater than a distance D1 from bias communicating member pivot axis B to first interface end 354.

A threaded opening 358 is formed in second brake arm 38 between second brake arm mounting portion 54 and second brake pad mounting portion 58 for receiving an adjustment member in the form of an adjustment screw 362 therein. The tip of adjustment screw 362 contacts first operating portion 338 of bias communicating member 322 for adjusting the relative position between first operating portion 338 and second brake arm 38 in a continuous manner.

A passage 366 in the form of an opening is formed in second brake arm 38 between second brake arm mounting portion 54 and second cable mounting portion 62. In this embodiment, passage 366 is formed as a substantially circumferentially-closed opening such as a completely circumferentially-closed opening. Passage 366 is dimensioned such that it is capable of receiving the portion of first brake arm 34 above first brake arm mounting portion 42 therethrough. As a result, when brake device 10 is viewed along first pivot axis X1 and second pivot axis X2, first brake arm 34 intersects second brake arm 38 so that first cable mounting portion 50 of first brake arm 34 and second cable mounting portion 62 of second brake arm 38 are located on opposite sides of the intersection.

Second cable mounting portion 62 of second brake arm 38 extends upwardly from passage 366 and includes a cable mounting wall 370 with a side surface 374, wherein a generally horizontally-oriented threaded opening 378 is formed at side surface 374 for receiving a cable mounting bolt 382 (FIG. 1) therein. First cable mounting portion 50 and second cable mounting portion 62 are configured such that, when brake device 10 is viewed perpendicular to first and second pivot axes X1 and X2 and first and second pivot axes X1 and X2 are horizontal, cable receiving slot 190 in first brake arm 34 substantially aligns with side surface 374 on second brake arm 38.

As shown in FIGS. 1-3, in this embodiment, an intermediate control element comprises a generally triangular control plate 386, a first intermediate control wire 390, and a second intermediate control wire 394. First intermediate control wire 390 has a first end attached to the lower right vertex of control plate 386 and a second end that extends through cable receiving slot 190 in first cable mounting portion 50 of first brake arm 34 and attaches to cable end bead 198. Second intermediate control wire 394 has a first end attached to the lower left vertex of control plate 386 and a second end attached to side surface 374 of second cable mounting portion 62 of second brake arm 38 by cable mounting bolt 382. A primary control element in the form of a primary control wire 398 is attached to the upper vertex of control plate 386.

Figure 6:
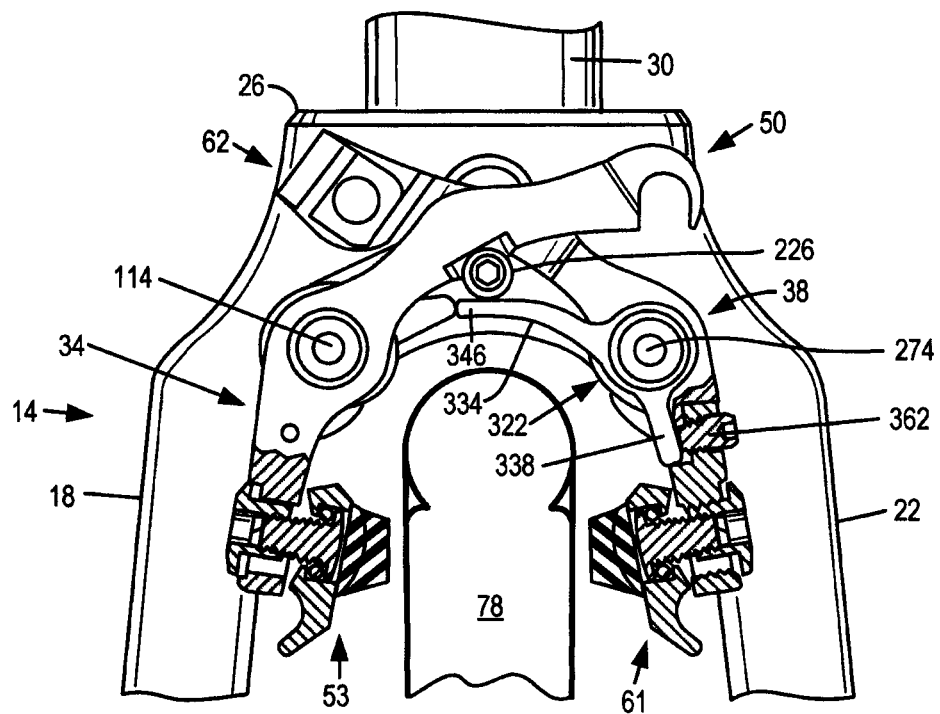
FIG. 6 is a partial cross-sectional view of the bicycle brake device in a brake-released position.
Figure 7:
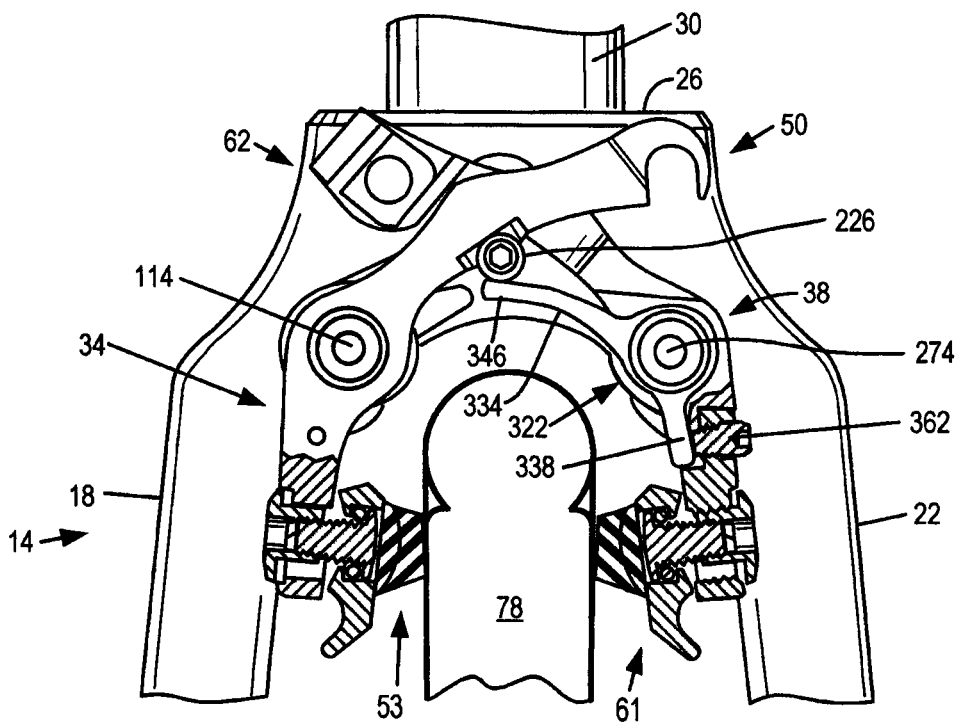
FIG. 7 is a partial cross-sectional view of the bicycle brake device in a brake-engaged position.
Figure 8:
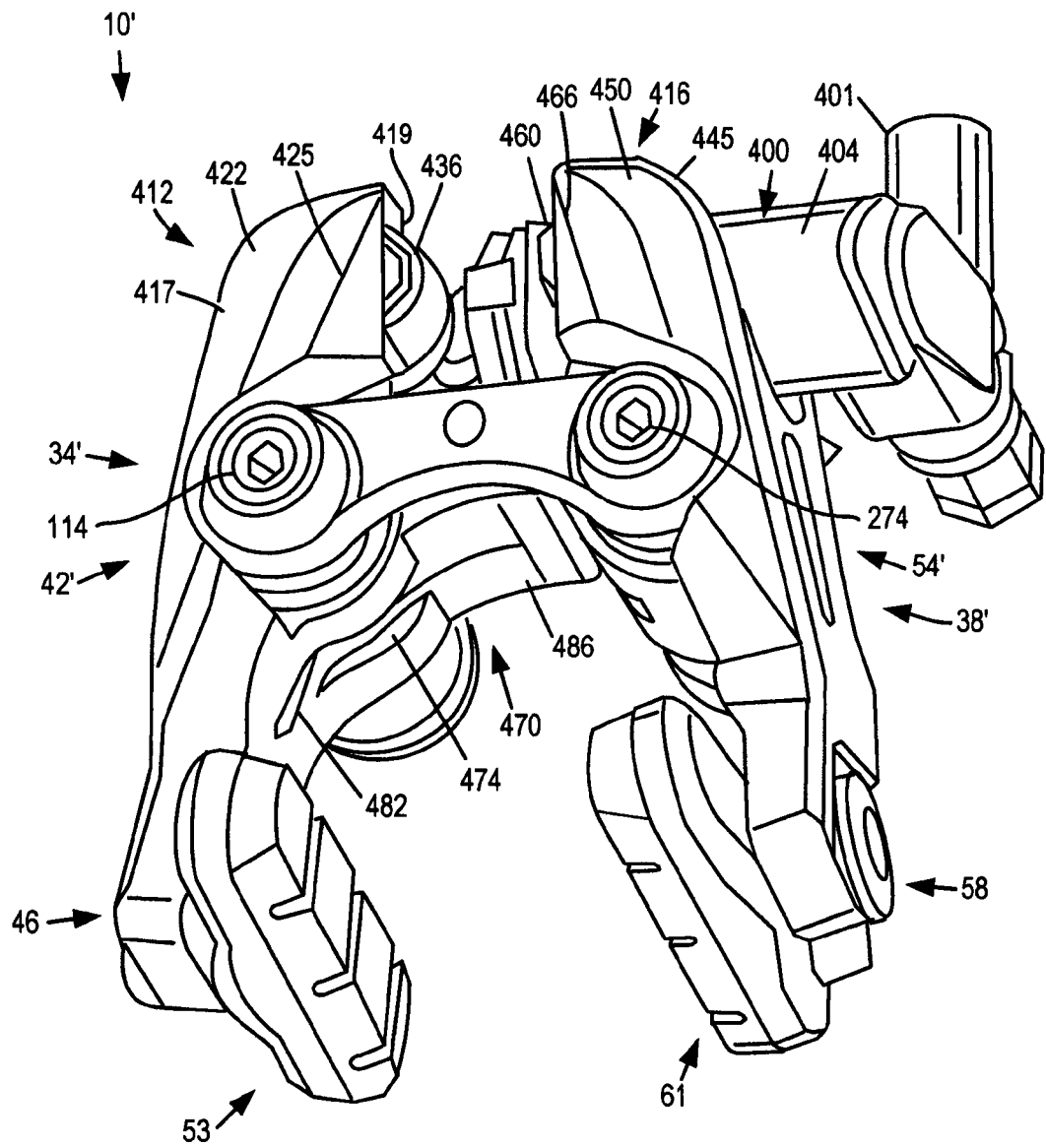
FIG. 8 is a lower perspective view of another embodiment of a bicycle brake device.

Operation of the device is shown in FIGS. 6 and 7, wherein FIG. 6 is a partial cross-sectional view of brake device 10 in a brake-released position, and FIG. 7 is a partial cross-sectional view of brake device 10 in a brake-engaged position. When primary control wire 398 is pulled upwardly, first cable mounting portion 50 of first brake arm 34 and second cable mounting portion 62 of second brake arm 38 are pulled upwardly, thereby causing first brake arm 34 to rotate counterclockwise and causing second brake arm 38 to rotate clockwise. During that time, the tip of adjusting screw 362 presses against first operating portion 338 of bias communicating member 322, and paddle 346 of second operating portion 334 of bias communicating member 322 presses against roller 226 attached to first brake arm 34 to synchronize the movement of first brake arm 34 and second brake arm 38. Thus, bias communicating member 322 also functions as a synchronizing member that communicates rotational force between first brake arm 34 and second brake arm 38 so that first brake arm 34 moves synchronously with second brake arm 38.

When primary control wire 398 is released, return spring 138 biases first brake arm 34 clockwise to move first brake pad 53 to the brake released position. The clockwise rotation of first brake arm 34 is communicated to paddle 346 of second operating portion 334 of bias communicating member 322 via roller 226, thereby causing bias communicating member 322 to rotate counterclockwise. The counterclockwise rotation of bias communicating member 322 is communicated to adjusting screw 362 in second brake arm 38 via first operating portion 338 of bias communicating member 322, thereby causing second brake arm 38 to rotate counterclockwise to move second brake pad 61 to the brake released position. Unlike prior art brake devices, only one return spring is required to rotate both first brake arm 34 and second brake arm 38 to the brake released positions. Second brake arm 38 is unbiased except for the biasing force from return spring 138 received from bias communicating member 322. As a result, less operating force is required to operate brake device 10. Furthermore, as shown in FIG. 5, since distance D2 from bias communicating member pivot axis B to second interface end 350 is greater than a distance D1 from bias communicating member pivot axis B to first interface end 354, bias communicating member 322 functions as a lever that provides a mechanical advantage so that the biasing force of return spring 138 is efficiently communicated from first brake arm 34 to second brake arm 38. Finally, the position of first brake pad 53 relative to second brake pad 61 may be adjusted easily using adjusting screw 362 to assure symmetrical positioning of first brake pad 53 and second brake pad 61 relative to wheel 78.

Since cable receiving slot 190 in first brake arm 34 substantially axially aligns with side surface 374 on second brake arm 38 when brake device 10 is viewed perpendicular to first and second pivot axes X1 and X2, first intermediate control wire 390 likewise axially aligns with second intermediate control wire 394. As a result, the axial forces applied to first brake arm 34 and second brake arm 38 by first intermediate control wire 390 and second intermediate control wire 394 are balanced, and torsional forces applied to first intermediate control wire 390 and second intermediate control wire 394 are reduced, thereby reducing wear on the control wires. Furthermore, in this embodiment, first intermediate control wire 390 and second intermediate control wire 394 are substantially axially centered relative to first brake arm 34 and second brake arm 38 when brake device 10 is viewed perpendicular to first and second pivot axes X1 and X2. This configuration further balances the axial forces applied to first brake arm 34 and second brake arm 38.

While the above is a description of various embodiments of inventive features, further modifications may be employed without departing from the spirit and scope of the present invention. For example, bias communicating member 322 need not be mounted within mounting groove 326. Bias communicating member 322 could be mounted outside second brake arm 38, or bias communicating member 322 could be mounted on or about first brake arm 34. Other adjusting members could be provided for adjusting the relative position between second brake arm 38 and first operating portion 338 of bias communicating member 322. For example a spacer or some other member or structure could be disposed between second brake arm 38 and first operating portion 338 for adjusting the relative position between second brake arm 38 and first operating portion 338 in a discrete or step-wise manner. Passage 366 need not be formed as a bounded opening as long as passage 366 accommodates the passage of first brake arm 34 therethrough.

While brake device 10 was operated using primary control wire 398, control plate 386, first intermediate control wire 390 and second intermediate control wire 394, the bias communicating function and/or the synchronizing function performed by bias communicating member 322 may be applied to other braking devices such as the embodiments described below.

FIGS. 8-16 illustrate further embodiments of a brake device 10' that includes inventive features. These embodiments include a first brake arm 34' and a second brake arm 38'. First brake arm 34' and second brake arm 38' share many features of first brake arm 34 and second brake arm 38 in the first embodiment, so only the differences will be described. Features that are the same as the first embodiment are numbered the same.

First brake arm 34' and second brake arm 38' are operated by a piston assembly 400 that receives hydraulic fluid from a hydraulic fluid line 401 and selectively extends and retracts a T-shaped output shaft in the form of a piston shaft 402 in response to the pressure of hydraulic fluid received through hydraulic fluid line 401. Piston shaft 402 is biased towards a retracted position by a return spring 403 (FIG. 12) disposed within a housing 404 of piston assembly 400 in a well-known manner.

Figure 11:
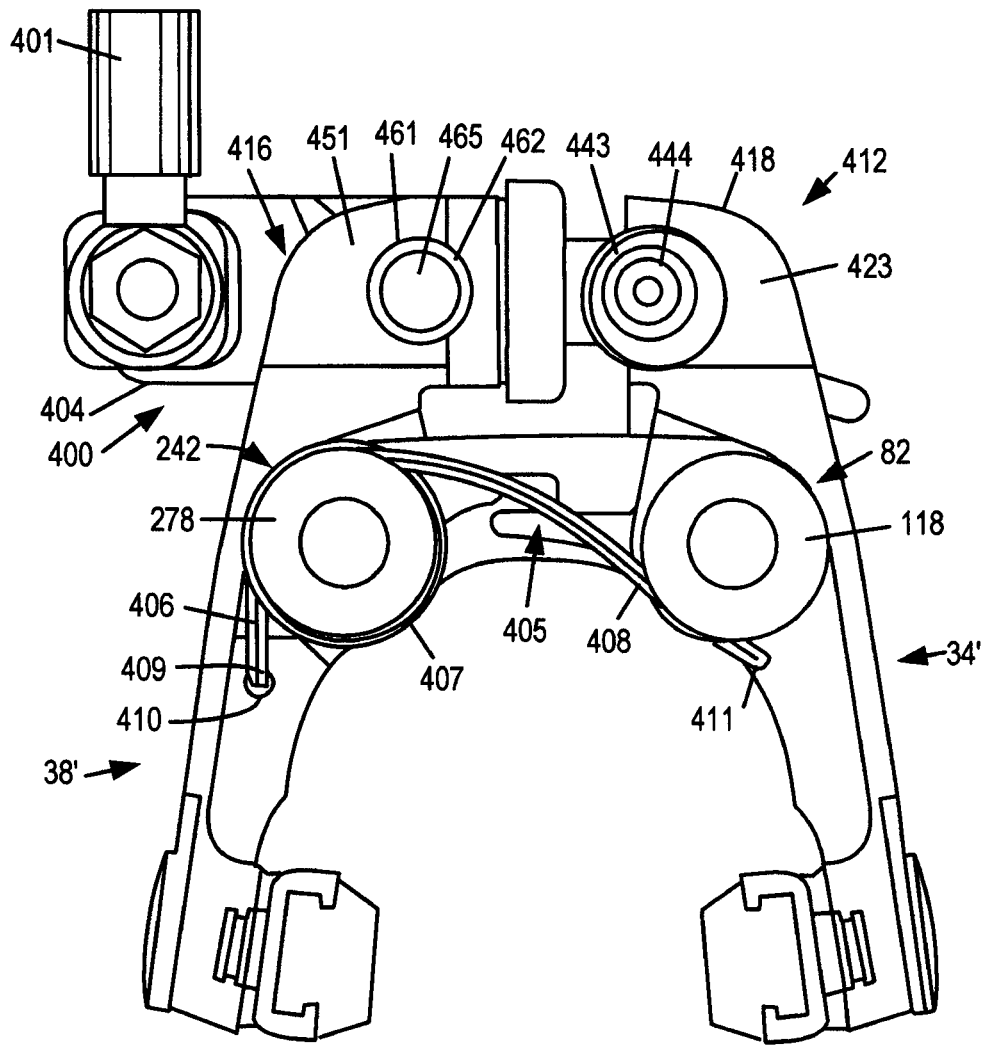
FIG. 11 is a rear view of the bicycle brake device shown in FIG. 8.

As shown in the rear view of brake device 10' in FIG. 11, return spring 138 in the first embodiment has been replaced by a return spring 405. In this embodiment, return spring 405 has a first portion or first spring end 406, a coiled portion 407, and a second portion or second spring end 408. First spring end 406 includes a first end tip 409, wherein first end tip 409 is inserted into an opening 410 in second brake arm 38'. Coiled portion 407 of return spring 405 coils around second spring mounting portion 282 (FIG. 4) of second mounting base 242, and second spring end 408 contacts first spring mounting portion 122 (FIG. 4) of first mounting base 82 so that a second end tip 411 of second spring end 408 is freely disposed at first brake arm 34'. As a result, second brake arm 38' is biased clockwise in FIG. 11, whereas first brake arm 34' is not rotationally biased.

Figure 9:
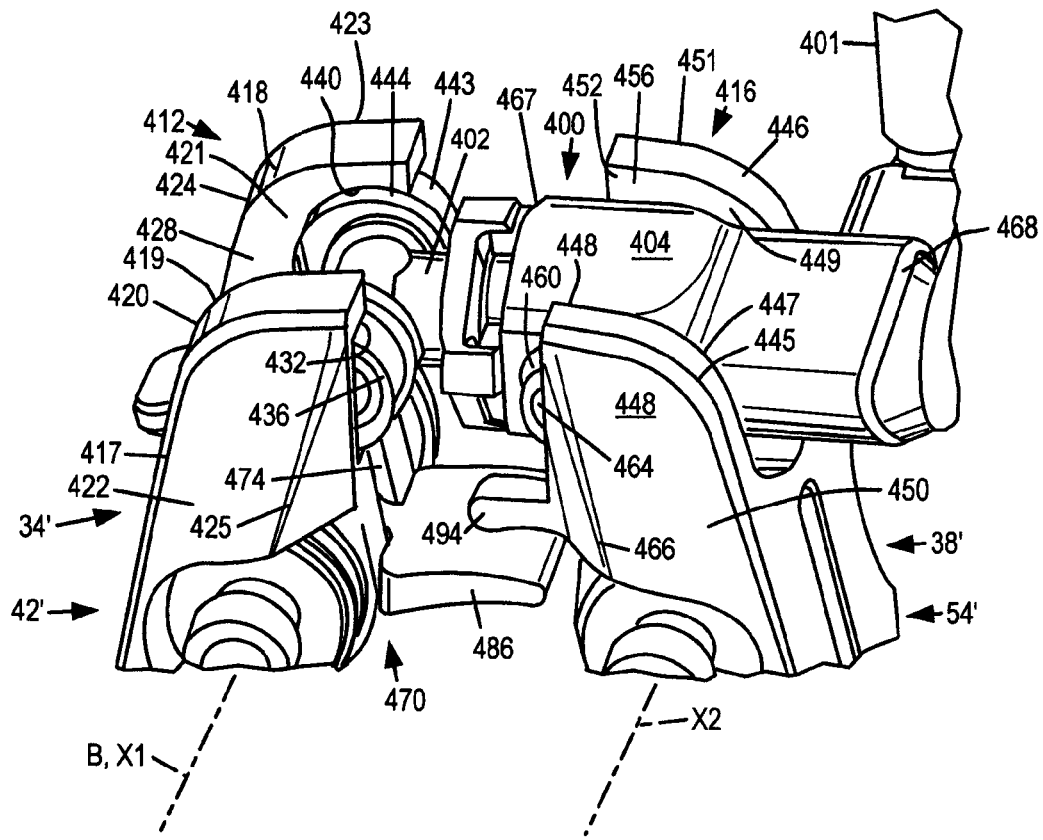
FIG. 9 is a detailed view of top portions of the bicycle brake device shown in FIG. 8.

As shown more clearly in FIGS. 9 and 11, to accommodate piston assembly 400, first brake arm 34' includes a first control interface portion 412, and second brake arm 38' includes a second control interface portion 416. First control interface portion 412 includes first and second mounting members in the form of first and second walls 417 and 418 that form a substantially vertically-oriented slot 428 therebetween. First wall 417 includes a first interior surface 419 that faces a second interior surface 421 of second wall 418. First wall 417 further includes a first exterior surface 422 opposite first interior surface 419, and second wall 418 includes a second exterior surface 423 opposite second interior surface 421. First and second couplings in the form of parallel and arcuate first and second shaft mounting claws 420 and 424 are disposed at first and second walls 417 and 418, respectively. First shaft mounting claw 420 forms a first cartridge bearing receiving recess 432 for receiving a first cartridge bearing 436 therein, and second shaft mounting claw 424 forms a second cartridge bearing receiving opening 440 for receiving a second cartridge bearing 444 and a spacer bushing 443 therein. First cartridge bearing 436 and second cartridge bearing 444 are rotatably supported on opposite ends of the T-shaped piston shaft 402.

In this embodiment, first shaft mounting claw 420 is mounted to first interior surface 419 of first wall 417 so as to be disposed entirely at first interior surface 419 and not to penetrate first wall 417. As a result, second surface 422 of first wall 417 covers first shaft mounting claw 420 when viewed for the front to help prevent foreign matter from being deposited at first shaft mounting claw 420. Preferably, but not necessarily, second surface 422 is convex and has a ridge in the form of a culminating crest 425 at an intermediate portion thereof to improve aesthetic appearance and aerodynamics of the brake assembly. Unlike first shaft mounting claw 420, second shaft mounting claw 424 penetrates through second wall 418 to facilitate mounting first and second cartridge bearings 436 and 444 and spacer bushing 443.

Second control interface portion 416 likewise includes first and second mounting members in the form of first and second walls 445 and 446 that form a substantially vertically-oriented slot 456 therebetween and having sufficient width to receive housing 404 of piston assembly 400 therein. First wall 445 includes a first interior surface 447 that faces a second interior surface 449 of second wall 446. First wall 445 further includes a first exterior surface 450 opposite first interior surface 447, and second wall 446 includes a second exterior surface 451 opposite second interior surface 449. First and second couplings in the form of parallel and arcuate first and second shaft mounting claws 448 and 452 are disposed at first and second walls 445 and 446, respectively. First shaft mounting claw 448 forms a first cartridge bearing receiving recess (not shown, but similar to first cartridge bearing receiving recess 432) for pivotably receiving an annular first bushing 460 therein, and second shaft mounting claw 452 forms a second cartridge bearing receiving opening 461 (FIG. 11) for pivotably receiving an annular second bushing 462 therein. First bushing 460 is mounted to a first mounting shaft 464 that extends from the side of housing 404, and second bushing 462 is similarly mounted to a second mounting shaft 465 extending from the opposite side of housing 404.

In this embodiment, first shaft mounting claw 448 is mounted to first interior surface 447 of first wall 445 of second control interface portion 416 so as to be disposed entirely at first interior surface 447 and not to penetrate first wall 445. As a result, first exterior surface 450 of first wall 445 covers first shaft mounting claw 448 when viewed from the front to help prevent foreign matter from being deposited at first shaft mounting claw 448. Preferably, but not necessarily, first exterior surface 450 is convex and has a ridge in the form of a culminating crest 466 at an intermediate portion thereof to improve aesthetic appearance and aerodynamics of the brake assembly. Unlike first shaft mounting claw 448, second shaft mounting claw 452 penetrates through second wall 446 to facilitate mounting first and second bushings 460 and 462.

As shown more clearly in FIG. 9, housing 404 of piston assembly 400 has a first axial end 467 and a second axial end 468, and second control interface portion 416 of second brake arm 38' is coupled to housing 404 (via first and second bushings 460 and 462 and first and second mounting shafts 464 and 465) between first axial end 467 of housing 404 and second axial end 468 of housing 404. Preferably, but not necessarily, second control interface portion 416 of second brake arm 38' is coupled to housing 404 at a location closer to first axial end 467 than second axial end 468. Even more preferably, second control interface portion 416 of second brake arm 38' is coupled to housing 404 in close proximity to first axial end 467.

Figure 10:
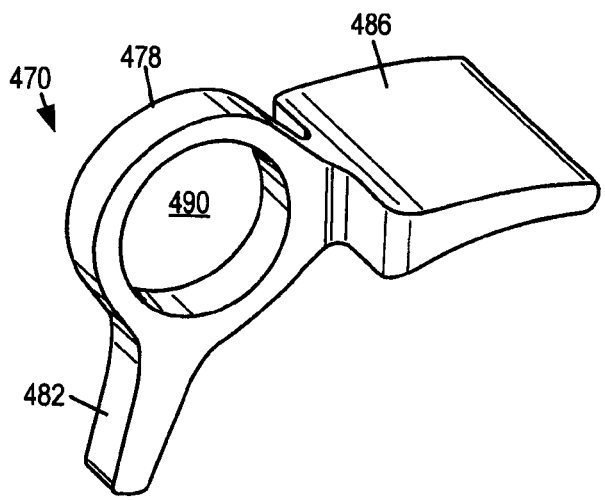
FIG. 10 is a perspective view of a bias communicating member used in the embodiments shown in FIGS. 8 and 9.

In this embodiment, a bias communicating member 470 is structured and dimensioned to be mounted within a vertical mounting groove 474 formed in first brake arm mounting portion 42' of first brake arm 34'. In this embodiment, first pivot axis X1 intersects mounting groove 474 so that bias communicating member 470 pivots around a bias communicating member pivot axis B that is coaxial with first pivot axis X1. As shown in FIG. 10, bias communicating member 470 is a continuous one-piece member that comprises an axially-thin bias communicating member mounting portion 478, an axially-thin, rod-shaped first operating portion 482, and an axially-thick second operating portion 486, wherein bias communicating member mounting portion 478 is disposed between first operating portion 482 and second operating portion 486. As a result, first operating portion 482 is disposed between first brake arm mounting portion 42' and first brake pad mounting portion 46 of first brake arm 34' when bias communicating member 470 is mounted in mounting groove 474.

Bias communicating member mounting portion 478 is formed as an axially-thin generally annular member having an opening 490 dimensioned to receive first arm mounting portion 150 (FIG. 4) of first bushing 94 therethrough. Second operating portion 486 is formed as an axially-thick substantially square paddle cam for engaging a thin rod-shaped cam follower 494 mounted to second brake arm 38' between second brake arm mounting portion 54' and second control interface portion 416. Second operating portion 486, and particularly the paddle-shaped portion, is dimensioned to extend substantially the entire distance from first brake arm 34' to second brake arm 38' when first brake arm 34' and second brake arm 38' are mounted to first and second fork legs 18 and 22, respectively. As in the first embodiment, the axially-thick paddle-shaped second operating portion 486 helps to prevent mud and other foreign matter propelled upwardly from wheel 78 from impinging upon the control structures located above second operating portion 486. In this case, second operating portion 486 helps to prevent mud and other foreign matter from impinging upon piston shaft 402 and housing 404 to minimize the chance that such foreign matter wears out the seals in housing 404 or otherwise interferes with the operation of piston shaft 402.

When piston assembly 400 extends piston shaft 402 to bias first brake arm 34' to rotate counterclockwise, the side of first brake arm 34' presses against first operating portion 482 of bias communicating member 470, and second operating portion 486 of bias communicating member 470 presses against cam follower 494 attached to second brake arm 38' to communicate biasing force from piston shaft 402 to second brake arm 38' and to synchronize the movement of first brake arm 34' and second brake arm 38'.

When piston assembly 400 retracts piston shaft 402, return spring 405 biases second brake arm 38' to rotate counterclockwise, the counterclockwise rotation of second brake arm 38' is communicated to second operating portion 486 of bias communicating member 470 via cam follower 494, thereby causing bias communicating member 470 to rotate clockwise. The clockwise rotation of bias communicating member 470 is communicated to first brake arm 34' via first operating portion 482 of bias communicating member 470, thereby causing first brake arm 34' to rotate clockwise to move first brake pad 53 to the brake released position and to synchronize the movement of first brake arm 34' and second brake arm 38'.

Figure 12:
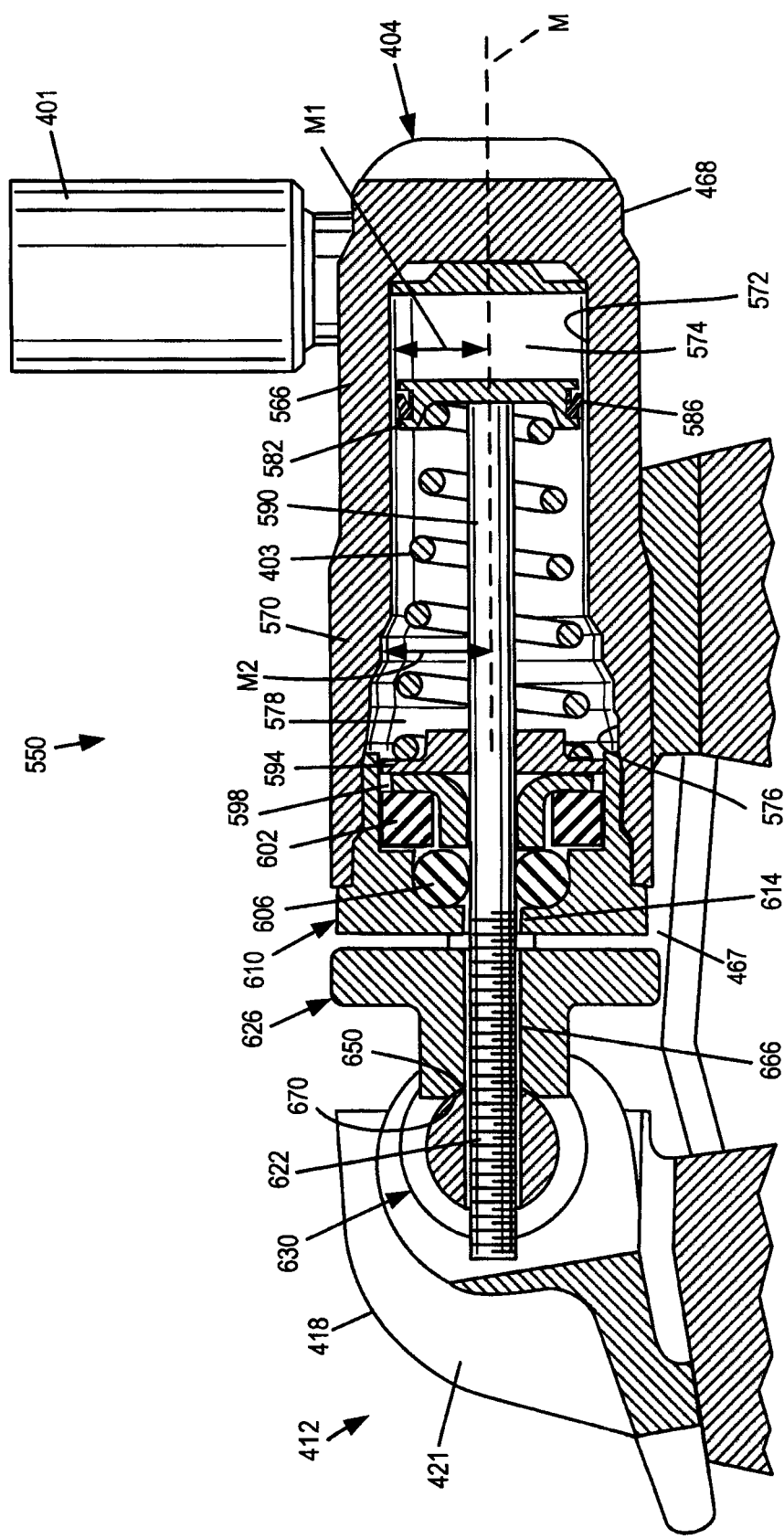
FIG. 12 is a cross-sectional view of an alternative embodiment of a piston assembly taken along line 12-12 in FIG. 13.
Figure 13:
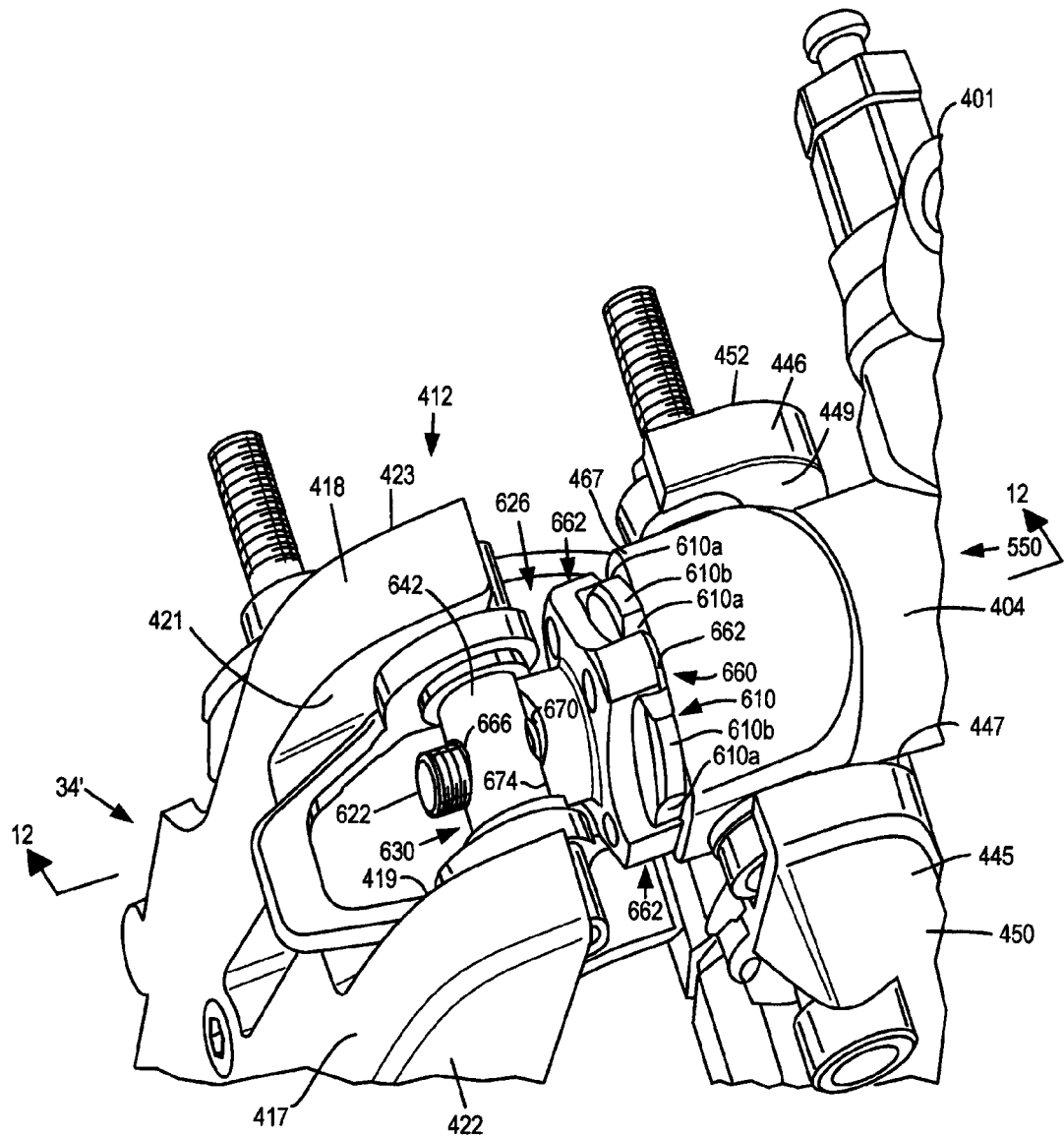
FIG. 13 is a detailed view of an alternative embodiment of a coupling between the piston shaft and the first control interface portion of the first brake arm.
Figure 14:
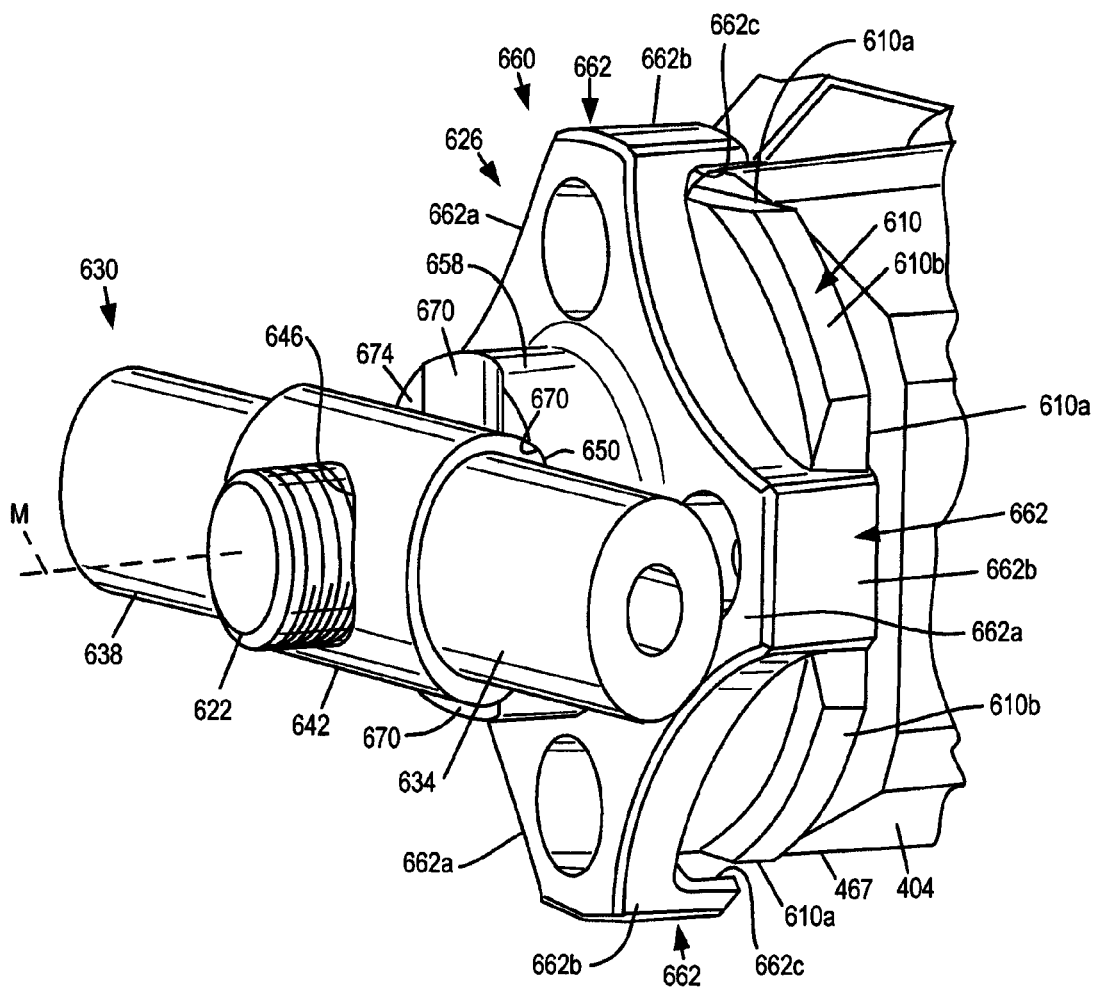
FIG. 14 is a more detailed view of the piston shaft, cross-dowel and adjusting member.

FIGS. 12-14 are detailed views of an alternative embodiment of a piston assembly 550. Piston assembly 550 is the same as piston assembly 400 in the first embodiment except as noted below, and structures that already have been described have been given the same reference numbers. As shown in FIG. 12, piston assembly 550 includes a housing 404 having a first axial end 467 and second axial end 468. Housing 404 includes a first wall 566 and a second wall 570, wherein an inner surface 572 of first wall 566 defines a hollow cylindrical piston chamber 574, and an inner surface 576 of second wall 570 defines a hollow accumulator chamber 578. Accumulator chamber 578 is in fluid communication with and in close proximity to (e.g., adjacent to) piston chamber 574 and is disposed between piston chamber 574 and first end 467 of housing 404.

A piston 582 is disposed within piston chamber 574, wherein a circular rubber lip seal 586 is fitted around piston 582 for slidably and sealingly fitting piston 582 within piston chamber 574 for movement along a movement axis M. A distance M1 from movement axis M to inner surface 572 first wall 566 is substantially constant to form a cylinder along substantially the entire range of motion of piston 582 along movement axis M. However, in this embodiment, a distance M2 from movement axis M to inner surface 576 of second wall 570 is greater than distance M1 from movement axis M to inner surface 572 of first wall 566. Furthermore, distance M2 from movement axis M to inner surface 576 of second wall 570 increases in a direction towards first end 467 of housing 404 so that accumulator chamber 578 has a stepped shape that forms a generally conical shape such as a frusto-conical shape. It should be apparent from FIGS. 9, 12 and 13 that second control interface portion 416 of second brake arm 38' in both embodiments is coupled to housing 404 at a location displaced towards first axial end 467 of housing 404 away from an axial position of piston 582.

An output shaft in the form of a piston shaft 590 is coupled to piston 582 for movement therewith along movement axis M, wherein piston shaft 590 extends through a spring supporting member 594, through a seal support member 598 that supports a rubber O-ring 602, and through a rubber seal member 606 mounted in an end cap 610 that is screwed into first end 467 of housing 404. End cap 610 has an opening 614 for receiving piston shaft 590 therethrough so that piston shaft 590 extends through first end 467 of housing 404 to a location outside of housing 404. A biasing member in the form of coil return spring 403 mentioned above is disposed in accumulator chamber 578 and piston chamber 574 and is positioned between piston 582 and spring supporting member 594 so that return spring 403 is disposed between piston 582 and first end 467 of housing 404 to bias piston 582 towards second end 468 of housing 404. In this embodiment, return spring 403 has a generally conical shape. Using a conical shape for return spring 403 allows a shorter return spring to be used compared to a cylindrically-shaped return spring. As a result, the axial length of housing 404 may be reduced to provide a more compact structure.

It should be readily apparent that the increased diameter of accumulator chamber 578 relative to piston chamber 574 allows accumulator chamber 578 to accumulate any external debris that may pass through seal member 606. As a result, such debris is prevented from entering piston chamber 574 where the debris could wear or damage inner surface 572 of piston chamber 574 and/or O-ring 586 of piston 582 as a result of the axial movement of piston 582.

As noted above, the structure of piston assembly 550 is substantially the same as piston assembly 400 in the first embodiment. The main difference lies in the structure of piston shaft 590. As shown in FIGS. 12-14, unlike piston shaft 402 in the first embodiment, piston shaft 590 has a straight threaded end portion 622 that extends through an adjusting member 626 located outside of housing 404 and through a coupling member in the form of a coupling shaft in the form of a cross-dowel 630.

Cross dowel 630 is a generally cylindrical member having smaller-diameter cylindrical end portions 634 and 638, a larger diameter cylindrical central portion 642, and a central coupling opening 646. End portions 634 and 638 are fitted within first and second cartridge bearings 436 and 444, respectively, for coupling cross-dowel 630 to first control interface portion 412 of first brake arm 34'. Coupling opening 646 is an unthreaded opening dimensioned to receive end portion 622 of piston shaft 590 therethrough so that end portion 622 can freely move back and forth within coupling opening 646 along movement axis M. The convex outer peripheral surface of central portion 642 in close proximity to (e.g., adjacent to) coupling opening 646 forms a pair of first control interface portion detent surfaces 650.

Adjusting member 626 comprises a cylindrical adjusting nut 658 and a housing indexing structure 660 in the form of a plurality of (e.g., four) radially outwardly extending adjusting member detent members in the form of indexing arms 662 that selectively engage corresponding housing detent members in the form of flats 610a on end cap 610. Each indexing arm 662 comprises a radially outwardly extending portion 662a and an axially extending portion 662b, wherein radially outwardly extending portion 662a extends radially outwardly from movement axis M, and axially extending portion 662b is a plate-shaped member that extends parallel to movement axis M. In this embodiment, a radius of an inner surface 662c of each axially extending portion 662b is slightly greater than a radius of its corresponding flat 610a and slightly less than a radius of an adjacent rounded portion 610b of end cap 610 so that the plurality of axially extending portions 662b loosely engage the plurality of flats 610a and are held in place primarily by the boundaries set by rounded portions 610b of end cap 610.

Adjusting nut 658 has a threaded inner peripheral surface 666 (FIG. 12) that screws onto the threaded outer peripheral surface of end portion 622 of piston shaft 590 so that adjusting nut 658 can move relative to piston shaft 590 in a continuous manner. Adjusting nut 658 also has an indexing structure in the form of a plurality of (e.g., four) concave adjusting member detent surfaces 670 evenly spaced around the axial end face 674 of adjusting nut 658 to index a position of adjusting nut 658, and hence adjusting member 626, relative to cross-dowel 630. More specifically, each adjusting member detent surface 670 has the shape of a longitudinally truncated cylinder whose axis extends radially from movement axis M, and the four adjusting member detent surfaces 670 are spaced 90° from each other so that opposite pairs of detent surfaces 670 can engage the opposed first control interface portion detent surfaces 650 on cross-dowel 630. As a result, adjusting member 626 can be rotationally held in position relative to cross-dowel 630 in 90° increments. Of course, more adjusting member detent surfaces 670 could be provided if it is desired to rotationally hold adjusting member 626 relative to cross-dowel 630 in finer increments.

Figure 15:
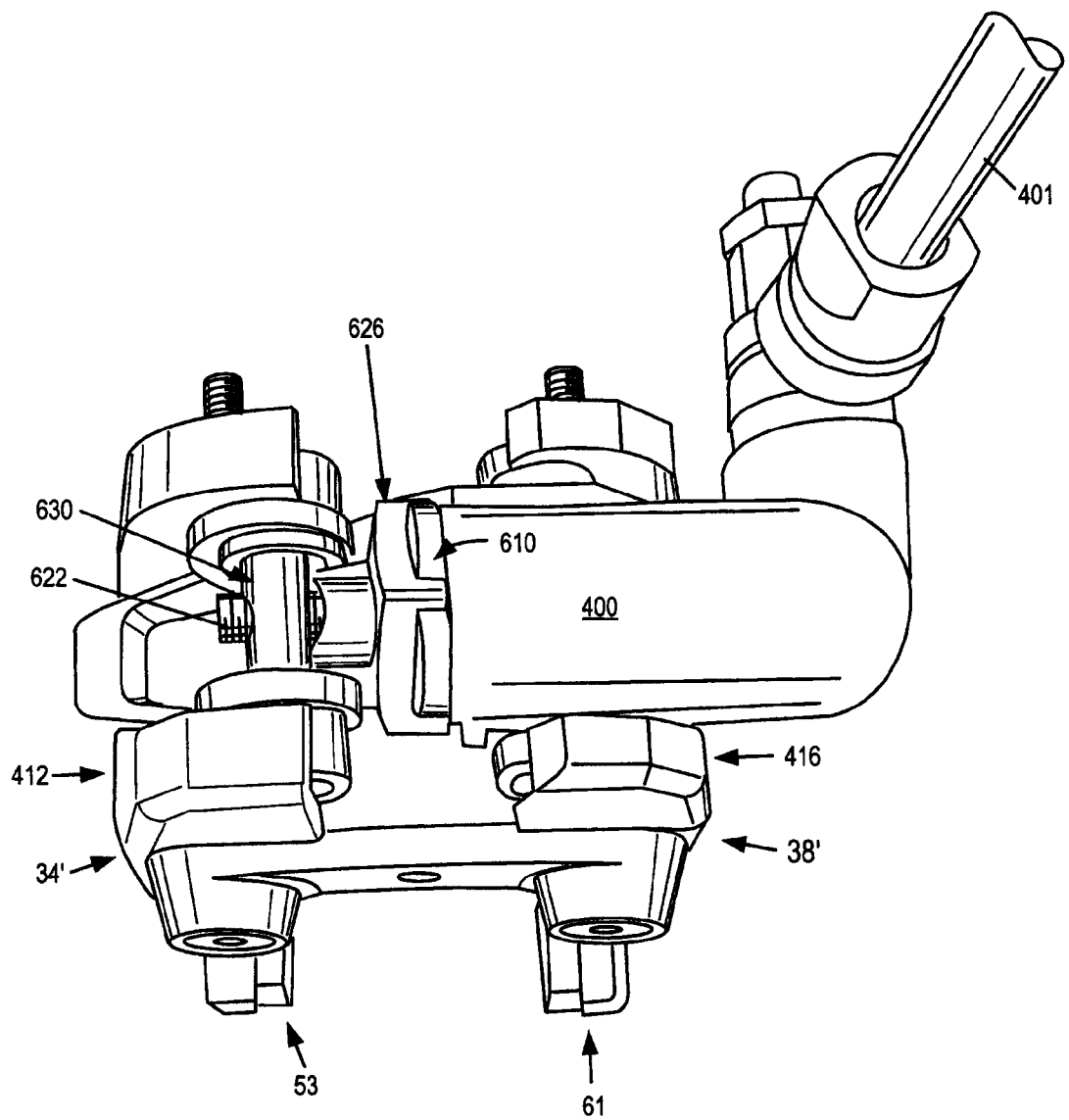
FIG. 15 is a top view of the brake assembly in a first adjustment state.

Since adjusting nut 658 threadingly engages piston shaft 590, rotating adjusting member 626 causes adjusting member 626 to adjust its axial position relative to piston shaft 590 in a continuous manner. Rotating adjusting member 626 clockwise in FIGS. 13 and 14 causes adjusting member 626 to move towards end cap 610 of housing 404. During that time, axially extending portions 662b of housing indexing structure 660 disengage from their currently engaged flats 610a of end cap 610 and frictionally slide over the adjacent rounded portions 610b of end cap 610 until axially extending portions 662b engage the next adjacent flats 610a. At the same time, adjusting member detent surfaces 670 disengage from their corresponding first control interface portion detent surfaces 650, and end face 674 of adjusting nut 658 frictionally slides over first control interface portion detent surfaces 650 until the following pair of rotationally adjacent adjusting member detent surfaces 670 engage first control interface portion detent surfaces 650. As a result, adjusting member 626 now is closer to end cap 610 of housing 404. Since return spring 405 biases second control interface portion 416 of second brake arm 38' towards first control interface portion 412 of first brake arm 34', first control interface portion 412 of first brake arm 34' moves towards second control interface portion 416 of second brake arm 38', piston shaft 590 slidingly extends further into coupling opening 646 of cross-dowel 630, and the axial length of piston shaft 590 between end cap 610 and cross-dowel 630 is reduced as shown in FIG. 15. At the same time, first brake pad mounting portion 46 of first brake arm 34' moves away from second brake pad mounting portion 58 of second brake arm 38' to the position shown in FIG. 15.

Figure 16:
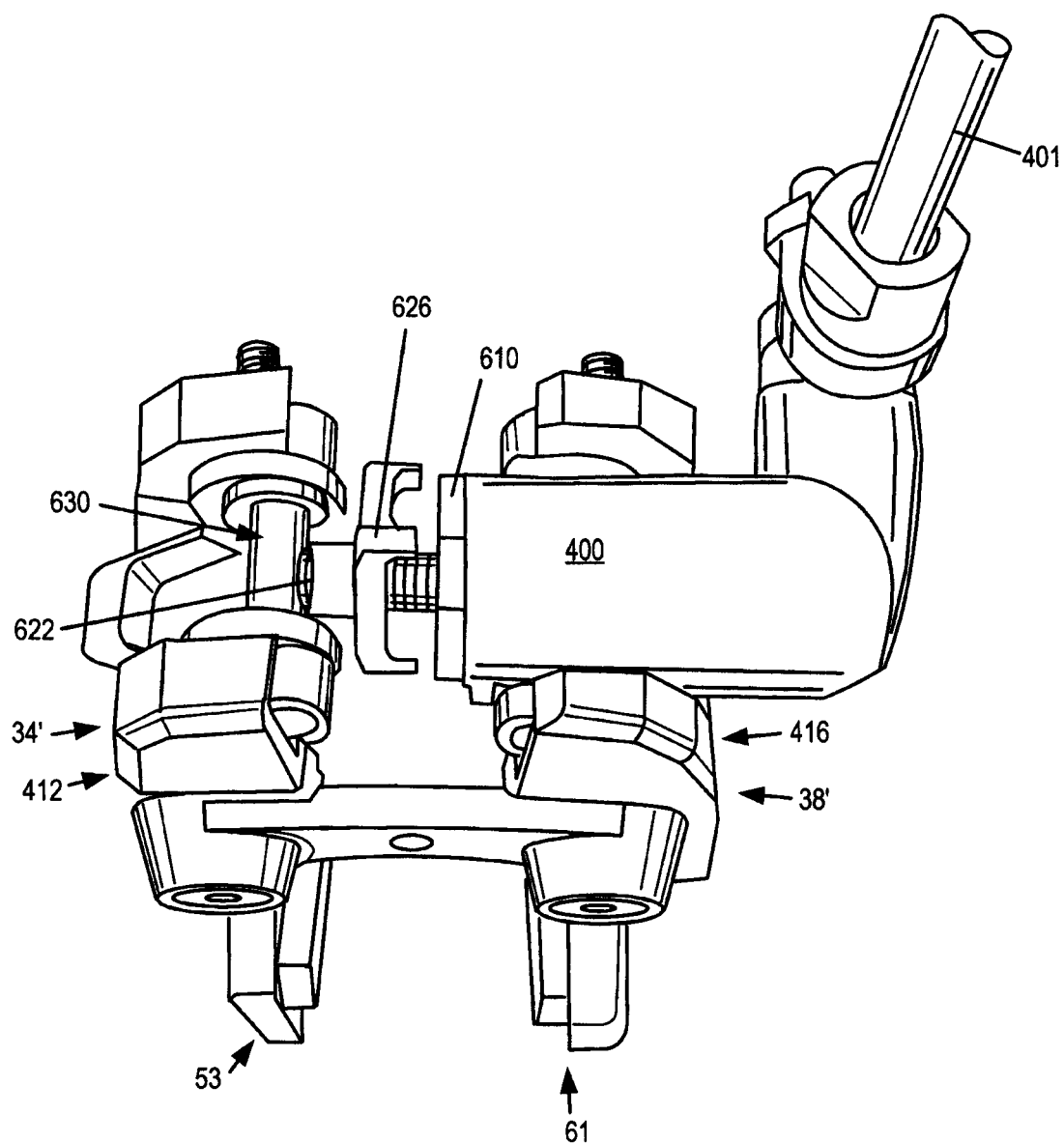
FIG. 16 is a top view of the brake assembly in a second adjustment state.

Rotating adjusting member 626 counterclockwise in FIGS. 13 and 14 causes adjusting member 626 to move away from end cap 610 of housing 404. During that time, first control interface portion 412 of first brake arm 34' moves away from second control interface portion 416 of second brake arm 38', piston shaft 590 slidingly retracts into coupling opening 646 of cross-dowel 630, and the axial length of piston shaft 590 between end cap 610 and cross-dowel 630 is increased as shown in FIG. 16. At the same time, first brake pad mounting portion 46 of first brake arm 34' moves towards second brake pad mounting portion 58 of second brake arm 38' to the position shown in FIG. 16.

Figure 17:
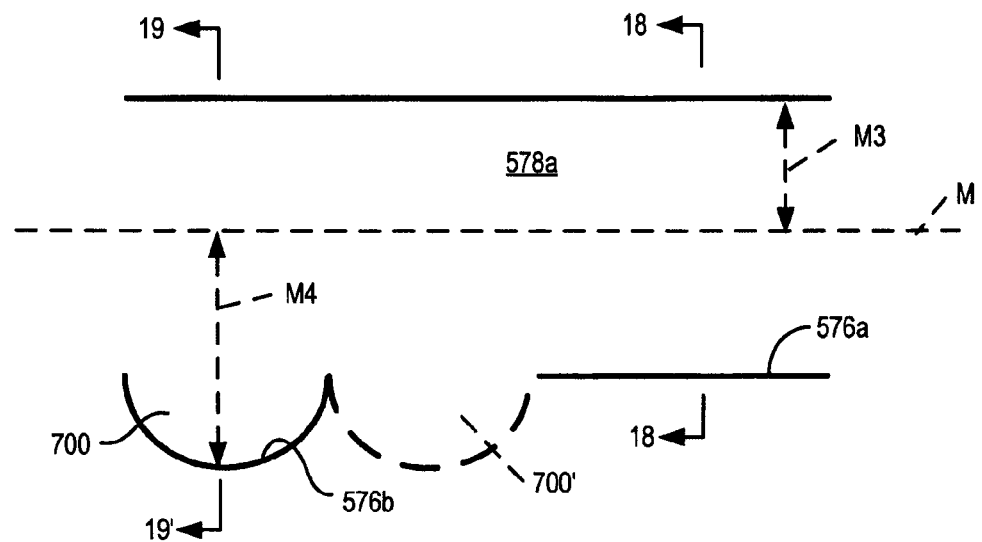
FIG. 17 is a schematic cross-sectional view of an alternative embodiment of an accumulator chamber.
Figure 18:
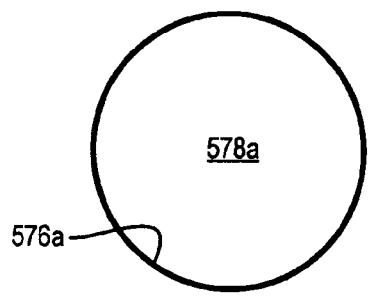
FIG. 18 is a view taken along line 18-18 in FIG. 17.
Figure 19:
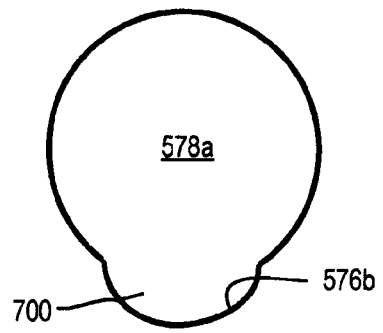
FIG. 19 is a view taken along line 19-19 in FIG. 17.

In the above embodiments, the size, shape, location or orientation of the various components may be changed as desired. For example, while distance M2 from inner surface 576 of accumulator chamber 578 to movement axis M in FIG. 12 uniformly increased in all radial directions so that accumulator chamber 578 had a generally frusto-conical shape, accumulator chamber 578 may have many different shapes to accumulate debris. For example, in an accumulator chamber 578a schematically shown in FIG. 17, a distance M3 from movement axis M to an inner surface 576a of accumulator chamber 578a is substantially constant to form a cylinder as shown schematically in FIGS. 17 and 18. However, a distance M4 from movement axis M to an inner surface 576b of accumulator chamber 578a is greater than distance M3 to form a generally semispherical concavity 700 as shown schematically in FIGS. 17 and 19. Concavity 700 preferably is located at the lower portion of the leftmost end of accumulator chamber 578a as shown in FIG. 17 so that debris that passes through seal member 606 may accumulate in concavity 700. Of course, concavity 700 may be located at any desired axial position as shown in broken lines by concavity 700' in FIG. 17, depending upon the application, and the actual lower portion of accumulator chamber 578a usually depends on the configuration of the overall brake assembly.

Figure 20:
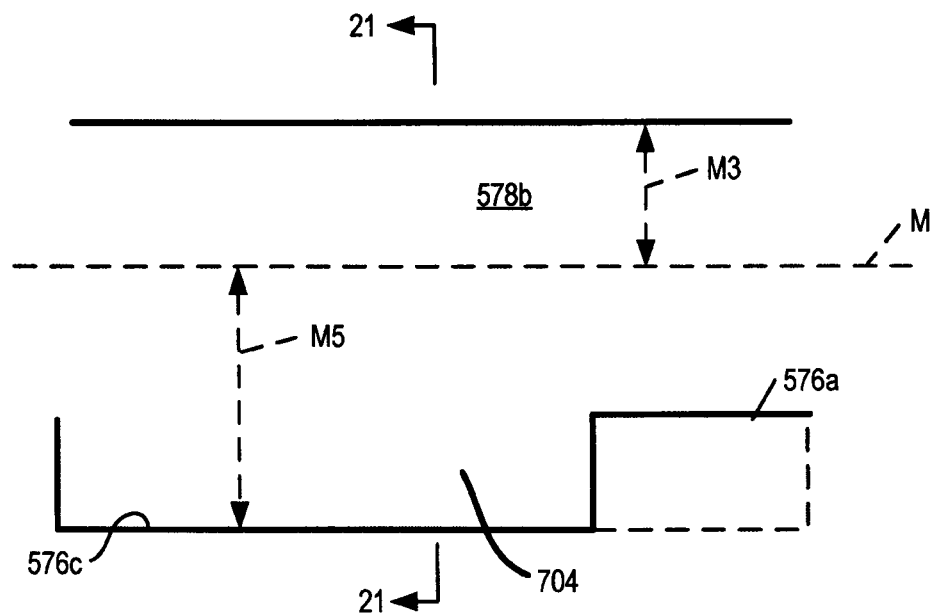
FIG. 20 is a schematic cross-sectional view of another alternative embodiment of an accumulator chamber.
Figure 21:
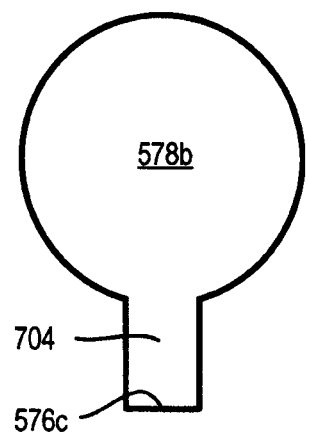
FIG. 21 is a view taken along line 21-21 in FIG. 20.

In an accumulator chamber 578b schematically shown in FIG. 20, a distance M3 from movement axis M to inner surface 576a of accumulator chamber 578b again is substantially constant to form a cylinder as in the embodiment shown in FIG. 17. However, a distance M5 from movement axis M to an inner surface 576c of accumulator chamber 578b is greater than distance M3 to form a concavity 704 in the form of a generally rectangular-shaped, axially-elongated groove as shown schematically in FIGS. 20 and 21. As in the embodiment shown in FIG. 17, concavity 704 preferably is located at the lower portion of the leftmost end of accumulator chamber 578b so that debris that passes through seal member 606 may accumulate in concavity 704. While concavity 704 is shown extending only partially along the lower surface of accumulator chamber 578b, concavity 704 may extend along the entire lower surface of accumulator chamber 578b as shown by the broken line in FIG. 20.

Figure 22:
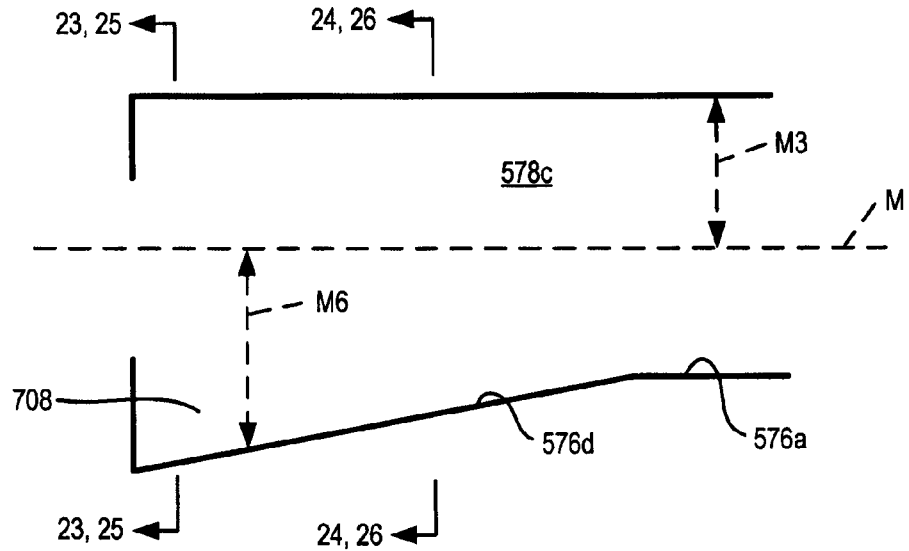
FIG. 22 is a schematic cross-sectional view of another alternative embodiment of an accumulator chamber.
Figure 23:
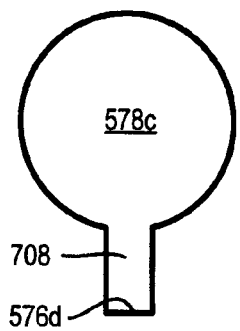
FIG. 23 is a view taken along line 23-23 in FIG. 22 showing a first embodiment of a concavity in the accumulator chamber.
Figure 24:
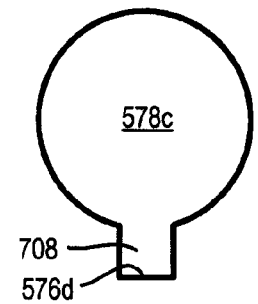
FIG. 24 is a view taken along line 24-24 in FIG. 22 showing the concavity from a different axial position.
Figure 25:
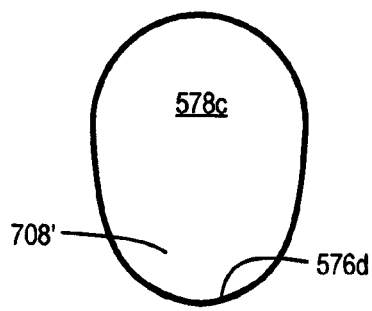
FIG. 25 is a view taken along line 25-25 in FIG. 22 showing a second embodiment of a concavity in the accumulator chamber.
Figure 26:
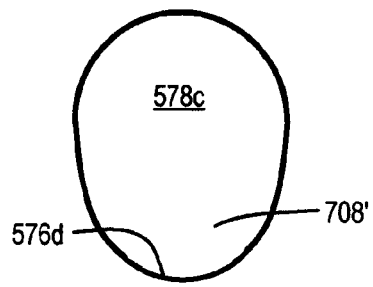
FIG. 26 is a view taken along line 26-26 in FIG. 22 showing the concavity from a different axial position.

In an accumulator chamber 578c schematically shown in FIG. 22, a distance M3 from movement axis M to inner surface 576a of accumulator chamber 578c again is substantially constant to form a cylinder as in the embodiment shown in FIG. 17. However, an inner surface 576d of accumulator chamber 578c is slanted relative to surface 576a and movement axis M so that a distance M6 from movement axis M to inner surface 576d increases axially M3 to form a concavity 708 with a slanted bottom surface. In this embodiment, concavity 708 may have the form of a generally rectangular-shaped, axially-elongated, decreasing-radius groove as shown schematically in FIGS. 22-24, but the concavity may have any desired shape such as a generally arcuately-shaped, axially-elongated, decreasing-radius groove concavity 708' shown schematically in FIGS. 22, 25 and 26. While slanted surface 576d is shown extending only partially along the lower surface of accumulator chamber 578c, slanted surface 576d may extend along the entire lower surface of accumulator chamber 578c as desired.

Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. For example, piston shaft 590 in the second embodiment may screw into cross-dowel 630 so that adjusting member 626 operates by abutting against end cap 610 of housing 404 so that rotation of adjusting member 626 causes piston shaft 590 to extend and retract relative to housing 404. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:

1. A bicycle brake apparatus comprising:
   a first brake arm including:
      a first brake arm mounting portion for pivotably mounting the brake arm to a bicycle frame member to pivot around a first pivot axis of a first pivot axle; and
      a first control interface portion;
   a second brake arm including:
      a second brake arm mounting portion for pivotably mounting the brake arm to a bicycle frame member to pivot around a second pivot axis of a second pivot axle; and
      a second control interface portion; and
   a piston unit including:
      a housing with a fluid chamber, wherein the housing has a first axial end and a second axial end;
      a piston movably disposed within the chamber; and
      an output shaft coupled to the piston and extending from the first axial end of the housing;
   wherein the first control interface portion of the first brake arm is coupled to the output shaft; and
   wherein the second control interface portion of the second brake arm is coupled to the housing between the first axial end of the housing and the second axial end of the housing.

2. The apparatus according to claim 1 wherein the second control interface portion of the second brake arm is pivotably coupled to the housing.

3. The apparatus according to claim 1 wherein the second control interface portion of the second brake arm is coupled to the housing at a location displaced toward the first axial end of the housing away from an axial position of the piston.

4. The apparatus according to claim 1 wherein the second control interface portion of the second brake arm is coupled to the housing at a location closer to the first axial end than the second axial end.

5. The apparatus according to claim 4 wherein the second control interface portion of the second brake arm is coupled to the housing in close proximity to the first axial end.

6. The apparatus according to claim 1 wherein the second control interface portion comprises spaced apart first and second mounting members, wherein the housing is disposed between the first and second mounting members.

7. A bicycle brake apparatus comprising:
a first brake arm including:
a first brake arm mounting portion for mounting the first brake arm to a bicycle frame member;
a first brake pad mounting portion; and
a first control interface portion;
a second brake arm including:
a second brake arm mounting portion for mounting the second brake arm to the bicycle frame member;
a second brake pad mounting portion; and
a second control interface portion;
a piston unit including:
a housing with a fluid chamber, wherein the housing has a first axial end and a second axial end;
a piston movably disposed within the chamber; and
an output shaft coupled to the piston and extending from the first axial end of the housing;
wherein the first control interface portion of the first brake arm is coupled to the output shaft;
wherein the second control interface portion of the second brake arm is coupled to the housing; and
an adjusting member disposed at the output shaft outside of the chamber, wherein the adjusting member adjusts a position of the output shaft relative to at least one of the housing or the first control interface portion of the first brake arm.

8. The apparatus according to claim 7 wherein the adjusting member adjusts an axial length of the output shaft between the housing and the first control interface portion.

9. The apparatus according to claim 7 wherein the adjusting member adjusts the position of the output shaft in a continuous manner.

10. The apparatus according to claim 9 wherein the adjusting member rotates to adjust the position of the output shaft.

11. The apparatus according to claim 7 wherein the first control interface portion of the first brake arm is coupled to the output shaft for axial movement relative to the output shaft.

12. The apparatus according to claim 11 wherein the adjusting member moves the first control interface portion axially relative to the output shaft to adjust the position of the output shaft.

13. The apparatus according to claim 12 wherein the output shaft is slidably coupled to the first control interface portion.

14. The apparatus according to claim 7 wherein the adjusting member includes an indexing structure to index a position of the adjusting member.

15. The apparatus according to claim 14 wherein the indexing structure includes an adjusting member detent surface that engages a corresponding first control interface portion detent surface on the first control interface portion of the first brake arm.

16. The apparatus according to claim 15 wherein the first control interface portion includes a coupling member that couples the output shaft to the first control interface portion, and wherein the first control interface portion detent surface is disposed on the coupling member.

17. The apparatus according to claim 16 wherein the adjusting member rotates around the output shaft to adjust an axial length of the output shaft between the coupling member and the housing.

18. The apparatus according to claim 17 wherein the coupling member includes a coupling opening, wherein the output shaft is disposed in the coupling opening.

19. The apparatus according to claim 18 wherein the first control interface portion detent surface is disposed in close proximity to the coupling opening.

20. The apparatus according to claim 19 wherein a plurality of the first control interface portion detent surfaces are disposed in close proximity to the coupling opening.

21. The apparatus according to claim 20 wherein the adjusting member includes a plurality of the adjusting member detent surfaces.

22. The apparatus according to claim 21 wherein the coupling member comprises a coupling shaft having a pair of convex surfaces on opposite sides of the coupling opening to form a corresponding pair of first control interface portion detent surfaces, and wherein the plurality of adjusting member detent surfaces comprise a plurality of concave surfaces that selectively engage the pair of convex surfaces on the coupling shaft.

23. The apparatus according to claim 14 wherein the indexing structure includes an adjusting member detent surface that engages a corresponding housing detent surface at the housing.

24. A cylinder apparatus for bicycle brake, wherein the apparatus comprises:
a housing including an inner cylindrical wall having a first wall and a second wall, wherein the first wall defines a piston chamber, and wherein the second wall defines an accumulator chamber;
a piston disposed within the piston chamber for movement along a movement axis; and
an output shaft coupled to the piston, wherein the output shaft extends through the accumulator chamber to an outside of the housing;
wherein a radial distance from the movement axis to the first wall is less than a radial distance from the movement axis to the second wall; and
wherein the piston slides along a portion of the first wall that has the distance that is less than the distance from the movement axis to the second wall.

25. The apparatus according to claim 24 wherein the second wall has a concavity.

26. The apparatus according to claim 24 wherein the second wall has a groove.

27. The apparatus according to claim 24 wherein the second wall has a surface that is slanted relative to the movement axis.

28. The apparatus according to claim 24 wherein the accumulator chamber has a generally conical shape.

29. The apparatus according to claim 24 further comprising a biasing member disposed between the piston and a first end of the housing to bias the piston toward a second end of the housing.

30. The apparatus according to claim 29 wherein the biasing member is disposed in the accumulator chamber and in the piston chamber.

31. The apparatus according to claim 30 wherein the biasing member comprises a coil spring.

32. The apparatus according to claim 31 wherein the coil spring has a generally conical shape.

33. The apparatus according to claim 30 wherein a distance from the movement axis to the first wall is substantially constant to form a cylinder along substantially the entire range of motion of the piston along the movement axis.

34. The apparatus according to claim 33 wherein the distance from the movement axis to the second wall increases in a direction toward the first end of the housing.

35. The apparatus according to claim 34 wherein the accumulator chamber has a generally conical shape.

\* \* \* \* \*